(12) United States Patent
Hanashima et al.

(10) Patent No.: US 9,764,649 B2
(45) Date of Patent: Sep. 19, 2017

(54) POWER MANAGEMENT APPARATUS, POWER MANAGEMENT METHOD AND POWER MANAGEMENT PROGRAM

(71) Applicant: Kabushiki Kaisha Toshiba, Minato-ku (JP)

(72) Inventors: Yumi Hanashima, Funabashi (JP); Miyako Miyoshi, Ichikawa (JP); Tatsuhiro Yamaguchi, Urayasu (JP); Koji Otsuji, Yokohama (JP); Kenichi Tanomura, Fuchu (JP); Masayuki Nogi, Hachioji (JP); Jin Kato, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 211 days.

(21) Appl. No.: 14/472,607

(22) Filed: Aug. 29, 2014

(65) Prior Publication Data
US 2014/0368154 A1 Dec. 18, 2014

Related U.S. Application Data

(63) Continuation of application No. PCT/JP2013/000562, filed on Feb. 1, 2013.

(30) Foreign Application Priority Data

Sep. 28, 2012 (JP) .................... 2012-218266

(51) Int. Cl.
*H02J 7/00* (2006.01)
*B60L 11/18* (2006.01)
(Continued)

(52) U.S. Cl.
CPC ............ *B60L 11/1809* (2013.01); *B60M 3/06* (2013.01); *H02J 3/32* (2013.01); *H02J 3/383* (2013.01);
(Continued)

(58) Field of Classification Search
CPC .................................................. B60L 11/1809
(Continued)

(56) References Cited

U.S. PATENT DOCUMENTS

| 4,352,049 A | 9/1982 | Franz, Jr. |
| 2012/0261986 A1 | 10/2012 | Ichikawa |
| 2012/0319642 A1 | 12/2012 | Suyama et al. |

FOREIGN PATENT DOCUMENTS

| JP | 2012-29560 A | 2/2012 |
| JP | 2012-105407 A | 5/2012 |

(Continued)

OTHER PUBLICATIONS

Shimada, Motomi et al., "Energy Storage System for Effective Use of Regenerative Energy in Electrified Railways", Hitachi Review, vol. 59, No. 1, 2010, pp. 33-38.

(Continued)

*Primary Examiner* — Richard V Muralidar
(74) *Attorney, Agent, or Firm* — Oblon, McClelland, Maier & Neustadt, L.L.P.

(57) ABSTRACT

According to an embodiment, a power management apparatus is provided with storage means, discharge plan creation means, discharge instruction means. The storage means stores a discharge amount of a power storage device to a distribution system, correspondingly to a prescribed parameter. The discharge plan creation means, when storable regenerative power is generated, creates a discharge plan to determine a discharge amount of the power storage device, from past data stored in the storage means, of regenerative power amount of a train and the discharge amount of the power storage device to the distribution system. The discharge instruction means outputs a discharge instruction to the power storage device.

18 Claims, 10 Drawing Sheets

(51) Int. Cl.
  *B60M 3/06* (2006.01)
  *H02J 3/32* (2006.01)
  *H02J 7/35* (2006.01)
  *H02J 3/38* (2006.01)
(52) U.S. Cl.
  CPC .............. *H02J 7/35* (2013.01); *Y02E 10/563* (2013.01); *Y02E 70/30* (2013.01)
(58) Field of Classification Search
  USPC ................................ 320/101, 128, 132, 137
  See application file for complete search history.

(56) References Cited

FOREIGN PATENT DOCUMENTS

| | | | | |
|---|---|---|---|---|
| JP | 2014-046821 | * | 3/2014 | ............. B60M 3/02 |
| JP | 2014-46821 A | | 3/2014 | |
| WO | WO 2011/080813 A1 | | 7/2011 | |

OTHER PUBLICATIONS

Mitsumoto, Kenji et al., "BEMS Technologies Contributing to Electricity Supply and Demand Adjustment through Demand Response", Toshiba Review, vol. 66, No. 12, 2011, pp. 16-19 with English Abstract.
Office Action issued Mar. 29, 2016 in Japanese Patent Application No. 2012-218266.
Extended European Search Report issued Jun. 27, 2016 in Patent Application No. 13840899.2.

* cited by examiner

| TIME | WEATHER | CLOUD AMOUNT | AIR TEMPERATURE | HUMIDITY |
|---|---|---|---|---|
| ⋮ | ⋮ | ⋮ | ⋮ | ⋮ |
| 8:00 | CLOUDY | 9 | 20 | 80 |
| 9:00 | FAIR | 5 | 21 | 70 |
| ⋮ | ⋮ | ⋮ | ⋮ | ⋮ |

| TIME | REGENERATIVE POWER AMOUNT STORED IN POWER STORAGE DEVICE [kWh] | COEFFICIENT α | STORAGE POWER AMOUNT FROM DISTRIBUTION SYSTEM [kWh] |
|---|---|---|---|
| ⋮ | ⋮ | ⋮ | ⋮ |
| 8:00~9:00 | 40 | 0.8 | 10 |
| 9:00~10:00 | 45 | 0.85 | 12 |
| ⋮ | ⋮ | ⋮ | ⋮ |

FIG. 3-3

| TIME | DISCHARGE INSTRUCTION VALUE [kWh] | DISCHARGE AMOUNT [kWh] |
|---|---|---|
| ⋮ | ⋮ | ⋮ |
| 8:00~9:00 | 40 | 40 |
| 9:00~10:00 | 42 | 41 |
| ⋮ | ⋮ | ⋮ |

FIG. 3-4

| TIME | STATION FACILITY 1 LOAD VALUE [kWh] | STATION FACILITY 2 LOAD VALUE [kWh] | ... |
|---|---|---|---|
| ⋮ | ⋮ | ⋮ | ⋮ |
| 8:00~9:00 | 10 | 25 | ⋮ |
| 9:00~10:00 | 20 | 25 | ⋮ |
| ⋮ | ⋮ | ⋮ | ⋮ |

POWER MANAGEMENT APPARATUS, POWER MANAGEMENT METHOD AND POWER MANAGEMENT PROGRAM

CROSS-REFERENCE TO RELATED APPLICATION

This application is based upon and claims the benefit of priority from the prior Japanese Patent Application No. 2012-218266, filed on Sep. 28, 2012; the entire contents of which are incorporated herein by reference.

This application is a continuation application of International Patent Application No. PCT/JP2013/000562, filed on Feb. 1, 2013.

FIELD

Embodiments described herein relate generally to a power management apparatus for railway systems, a power management method for railway systems and a power management program for railway systems.

BACKGROUND

Recently, efforts of energy management have been spreading in countries for the effective use of power.

As one of the efforts, there is a BEMS (Building and Energy Management System). The BEMS is a system for reducing energy consumption by managing power used by an equipment/facility and so on installed in a building. For example, using an art to perform supply and demand adjustment of power, and so on, by a demand response, the reduction of the power and power amount of a building is enabled.

On the other hand, in a railway field, there is an energy management method in which a power storage device is installed in a railway vehicle, for example, and which effectively uses power, by performing charge/discharge control based on the information of a voltage and a current and so on of the power storage device.

In addition, in the railway field, efforts to reuse regenerative power have been promoted, for the purpose of effective use of the power in a railway system. It is common to use the regenerative power as a power for another train performing power running, but when no train performing power running is present, the power loss due to regenerative invalidation is generated. As its countermeasure, there is a method in which a power storage device is installed in a substation, and regenerative power is stored in the power storage device, to utilize the power at the time of power running of a train or emergency. The document relating to the above-described art is described in Japanese Patent Application Publication No. 2012-29560, the entire contents of which are incorporated herein by reference.

BRIEF DESCRIPTION OF THE DRAWINGS

FIG. 3-1 is a diagram exemplifying a data structure of the database.

FIG. 3-2 is a diagram showing an example of the weather data on the above-described database.

FIG. 3-3 is a diagram showing an example of the charge data on the above-described database.

FIG. 3-4 is a diagram showing an example of the discharge data on the above-described database.

FIG. 4 is a block diagram showing a configuration of the railway power management apparatus in the first embodiment.

FIG. 8-1 is a diagram exemplifying a structure of the database in the same embodiment.

FIG. 8-2 is a diagram showing an example of the load data on the above-described database.

DETAILED DESCRIPTION

In the case of storing regenerative power in a power storage device, since regenerative power is generated in a large power/power amount at one time, and is fragmentarily generated, a power storage device with a limited capacity becomes impossible to store the regenerative power, if the power in the power storage device is not intentionally discharged. Accordingly, for the effective use of regenerative power in a railway system, a system to create a discharge plan of a power storage device to store regenerative power is required. In addition, recently, solar power generation has been widely used. In the case of using the solar power generation in a station facility, to store the power, it becomes necessary to be able to create a discharge plan including its power storage.

According to an embodiment, a power management apparatus is provided with storage means, discharge plan creation means, discharge instruction means. The storage means stores a discharge amount of a power storage device to a distribution system, correspondingly to a prescribed parameter, as an example. The discharge plan creation means, when storable regenerative power is generated, creates a discharge plan to determine a discharge amount of the power storage device, from past data stored in the storage means, of regenerative power amount of a train and the discharge amount of the power storage device to the distribution system, as an example. The discharge instruction means outputs a discharge instruction to the power storage device, as an example.

According to an embodiment, in order to effectively use power such as regenerative power in a station facility, for example, it is possible to provide a power management apparatus for managing a power storage device which stores the power and discharges the power to a distribution system, so that the power storage device effectively discharges the power.

A power management apparatus of an embodiment which will be described below, in a power storage device supposed to be installed in a station, stores powers such as regenerative power which has not been interchanged between trains, and solar power energy from a solar power generation device which has not been used in a station facility, and effectively uses the energy. An embodiment described below proposes, a power management apparatus which is provided with, as its configuration, means for creating a discharge plan from a power storage device to a distribution system (a discharge plan creation unit), means for determining a discharge amount, and instructing discharge (a discharge determination/instruction unit), and means for storing a discharge result (a discharge execution result storage unit). In the present specification, discharge means to supply power from a power storage device to a distribution system.

Hereinafter, railway power management apparatuses according to various embodiments will be described with reference to the drawings.

First Embodiment

Figure 1:
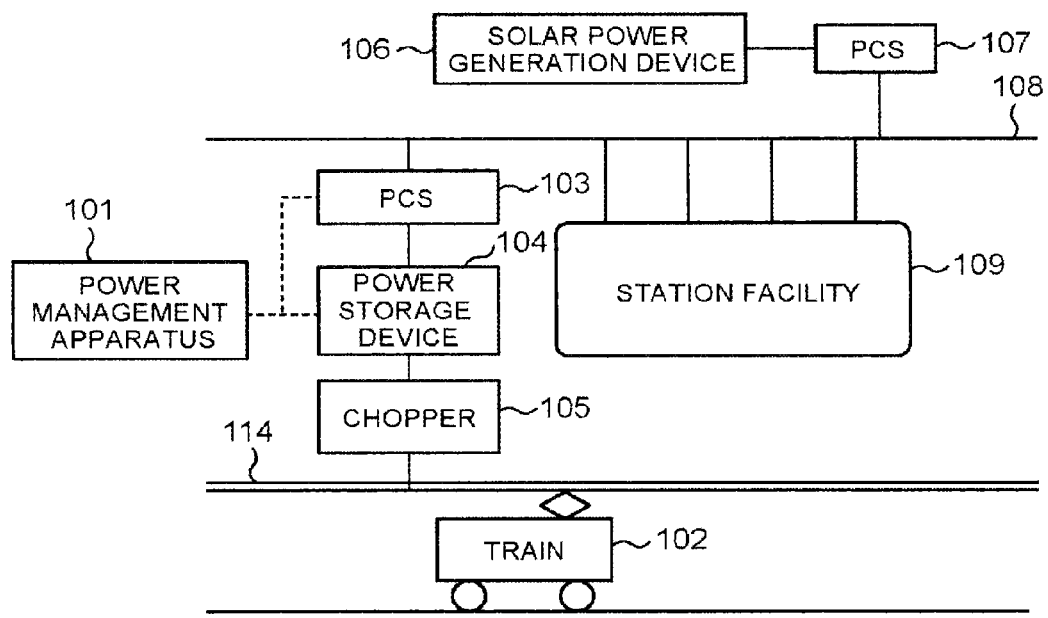
FIG. 1 is a diagram showing a schematic configuration of a station system and an electric railway system which use a railway power management apparatus of a first embodiment.

To begin with, a station system and an electric railway system which utilizes a power management apparatus of a first embodiment will be described in detail. FIG. 1 is a diagram showing a schematic configuration of a station system and an electric railway system which utilizes a power management apparatus of a first embodiment.

A train 102 in an electric railway system operates by electricity obtained from a feeder 114 as a power source. A substation feeds electricity to the feeder 114.

In a station, a plurality of station facilities 109 such as an elevator, an escalator, lighting are installed. In addition, a solar power generation device 106 is further installed, and the solar energy obtained from the solar power generation device 106 is converted from DC to AC, while the voltage, the frequency, the number of phases, the number of lines being matched, by a PCS (Power Conditioning System) 107, and the AC power is supplied to a distribution system 108. In addition to the solar energy from the solar power generation device 106, power from a substation is transmitted to the distribution system 108 through a transformer.

It is assumed that a power storage device 104 is installed in a station. The reason for this is because, if the power storage device 104 is installed in a substation, since a substation is generally located at a position remote from a station, such as between stations, transmission loss is generated at the time of charging and discharging. The power storage device 104 stores the regenerative power, regenerated by the train 102 in the electric railway system and has not utilized by another train, and the power which has not been utilized in the station facilities 109, out of the solar energy obtained from the solar power generation device 106. The regenerative power of the train 102 passes through the feeder 114, and is subjected to the voltage adjustment by a chopper 105, and is stored in the power storage device 104. In addition, the power which has not been utilized in the station facilities 109 out of the solar energy obtained from the solar power generation device 106 is stored in the power storage device 104 through a PCS 103. In addition, in the present embodiment, it is assumed that the power storage device 104 is configured to simultaneously store power and discharge. For example, the power storage device 104 is provided with a plurality of units, and selectively uses a group of the unit for storing power and a group of the units for discharging, and thereby can simultaneously store power and discharge, or may be configured to simultaneously perform charge/discharge with one unit.

A power management apparatus 101 creates a discharge plan for the above-described power storage device 104, determines a discharge amount to instruct discharge, and stores a power discharge result. In addition, the power management apparatus 101 controls the PCS 103 so as to store the regenerative power regenerated by the train 102 in the electric railway system, and the power which has not been utilized in the station facilities 109 out of the solar energy obtained from the solar power generation device 106, in the power storage device 104, and to discharge the power to the distribution system 108.

Figure 2:
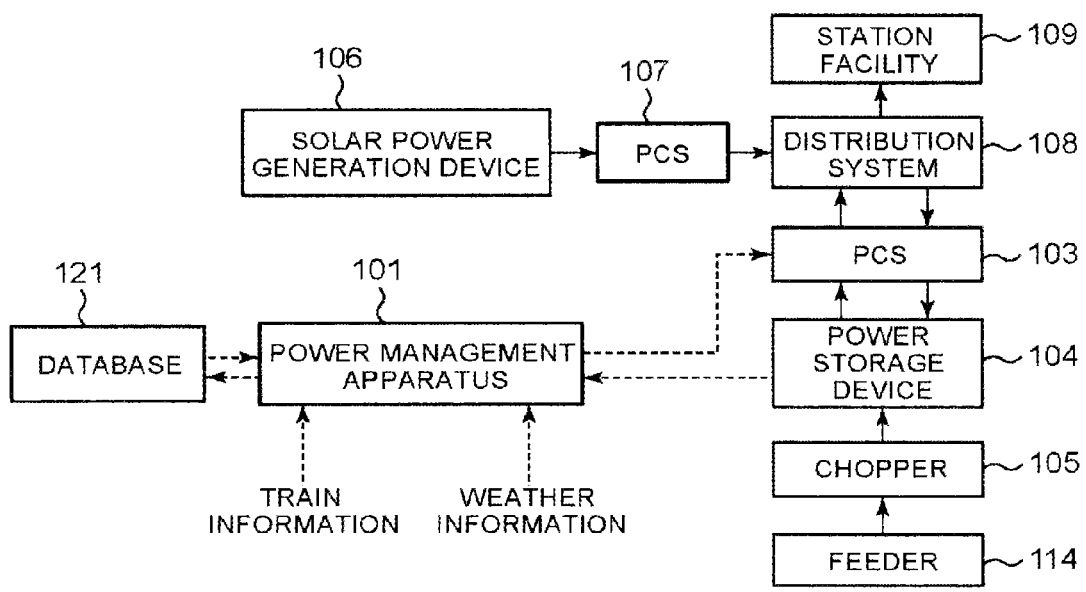
FIG. 2 is a block diagram showing the railway power management apparatus of the same embodiment, the related devices, and a flow of data and signals to be exchanged.

FIG. 2 is a block diagram showing the power management apparatus for railway system of the first embodiment, the related devices, and a flow of data and signals to be exchanged.

When data in the same time, the same train diagram, and the same weather (at the time of a similar cloud amount and a similar air temperature in a prescribed range) is present in the past discharge execution result in a database 121, the power management apparatus 101 creates a discharge plan citing such data. And the power management apparatus 101 determines a discharge amount based on this discharge plan, and instructs discharge to the PCS 103. When there is not corresponding history data discharging execution result, the power management apparatus 101 creates a discharge plan with a method described later, and stores a discharge execution result at that time in the database 121.

The power storage device 104 which has been stored with the regenerative power and the solar power energy discharges power to the distribution system 108, by the instruction from the railway power management apparatus 101. The discharge execution result is newly stored in the database 121.

Figures 1, 2, 3:
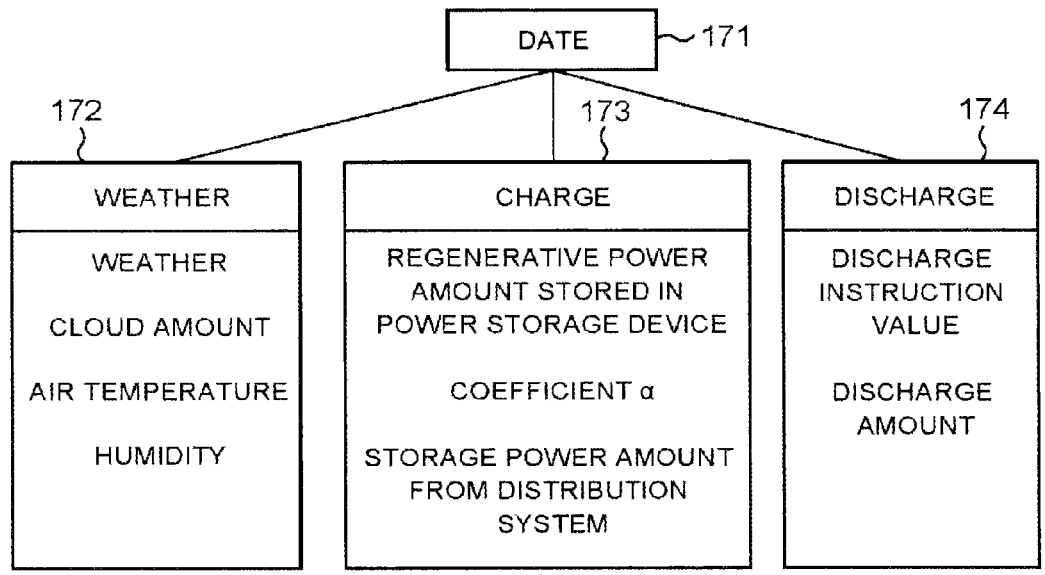
Figure 4:
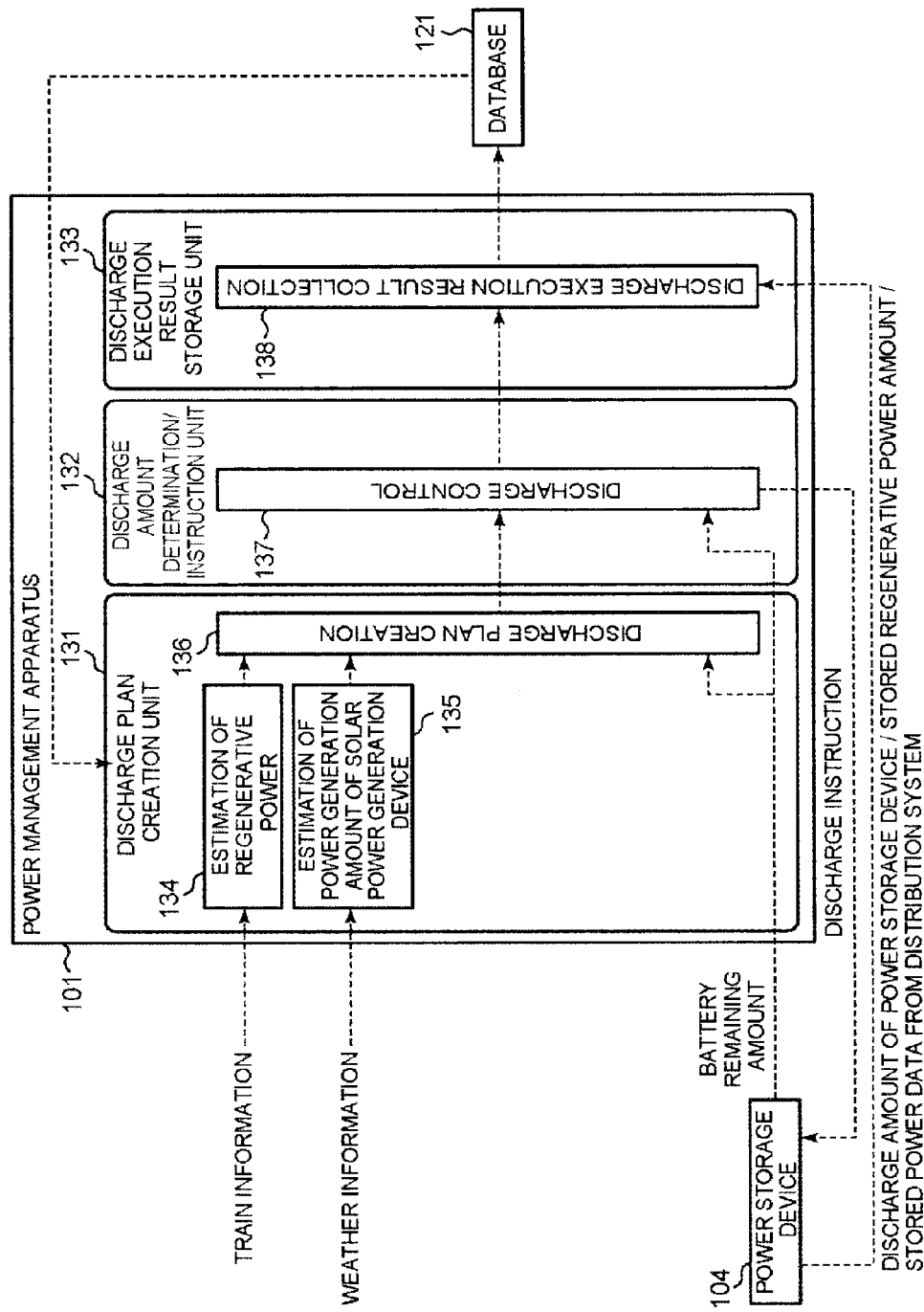
Figure 5:
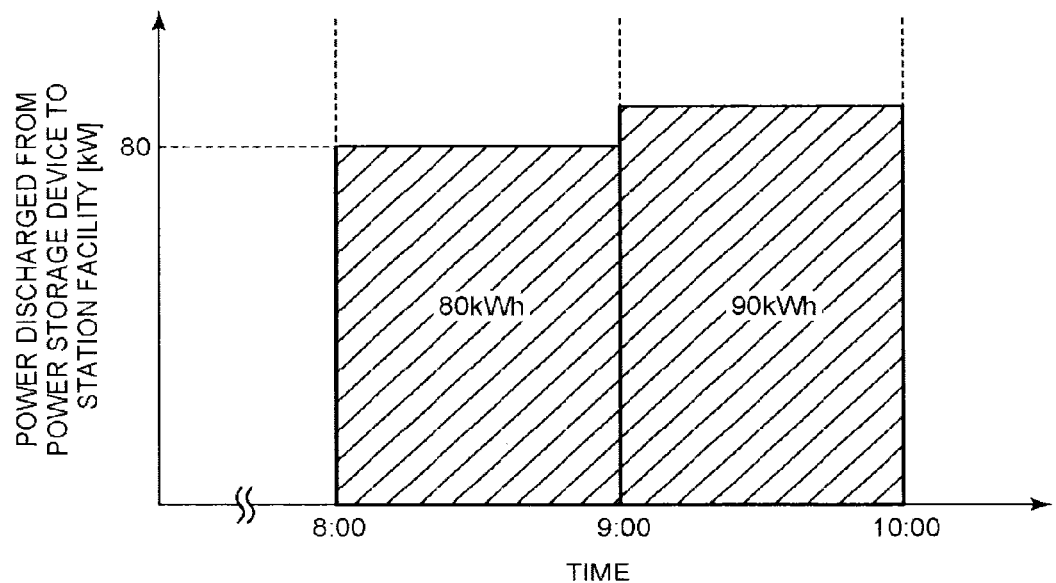
FIG. 5 is a graph showing an example of the relation between a time regarding discharge of the power storage device and a power to be discharged in the same embodiment.

FIG. 3-1-FIG. 3-4 are diagrams each exemplifying a structure of the database. In addition, FIG. 3-2, FIG. 3-3, and FIG. 3-4 are diagrams respectively showing an example of weather data on the database, an example of charge data on the database, and an example of discharge data on the database.

The database 121 is a hierarchical type, and stores relating data such a manner that a date 171 is determined as a parent, and each of a weather 172, a charge 173, a discharge 174 is determined as a child, as shown in FIG. 3-1. In the date 171, a date is described.

The weather data is data composed of a time, weather, a cloud amount (a percentage of clouds to the whole sky), an air temperature, a humidity and so on, as shown in FIG. 3-2. In addition, regarding the relation between the cloud amount and the weather, when there is no rainfall, when the cloud amount is expressed by 11 states of 0, 1, 2, . . . , 9, 10, for example, there is the relation such as, for the cloud amounts: 0→1→2→3→4→5→6→7→8→9→10, the weathers are respectively: clear sky→clear sky→fair→fair→fair→fair-→fair→fair→fair→cloudy→cloudy.

The charge data is data composed of a time, a regenerative power amount stored in the power storage device 104, a coefficient α, a stored power amount (solar power generation) from the distribution system 108, and so on, as shown in FIG. 3-3. The coefficient α is a ratio of a regenerative power amount which is actually stored in the power storage device 104 to an ideal regenerative power amount, and will be described in detail later. In addition, the discharge data is data composed of a time, a discharge instruction value, a discharge amount, and so on, as shown in FIG. 3-4. In addition, this database 121 has a function to retrieve a similar item from a single or a plurality of items. In addition, each of the data structure shown in FIG. 3-1~FIG. 3-4 is an example, and is not limited to this. In this example, each data of the weather 172, the charge 173, the discharge 174 is configured by an individual table, but these data may be configured by a single table.

In addition, the power management apparatus 101 can acquire train information such as an operation diagram, and weather information such as weather, a cloud amount, an air temperature, a humidity, and so on from an external system. By acquiring the train information, the power management apparatus 101 can estimate the regenerative power stored in the power storage device 104, and by acquiring the weather information, it can estimate the generation amount of the solar power generation device 106 from the data.

Next, a configuration of the power management apparatus of the present embodiment will be described. FIG. 4 is a block diagram showing a configuration of the power management apparatus of the present embodiment.

The power management apparatus 101 is provided with a discharge plan creation unit 131, a discharge amount determination/instruction unit 132, a charge execution result storage unit 133, as its main portion.

The discharge plan creation unit 131 of the power management apparatus 101 executes, as its function (or, a processing to be executed), a processing of an estimation (134) of a regenerative power amount, and a processing of an estimation (135) of a power generation amount of the solar power generation device 106, to create a discharge plan (136). For this purpose, the discharge plan creation unit 131 acquires train information and weather information from the outside.

The processing of the estimation (134) of the regenerative power amount by the discharge plan creation unit 131 is executed using the acquired train information. As the train information, an operation diagram in a train diagram creation device, and data of a type and classification in a vehicle operation plan creation device are acquired. In addition, for the estimation of the regenerative power amount, the value of the regenerative power amount per formation which is generated when stopping at a station is previously prepared, for each type and classification, in the discharge plan creation unit 131 (may be prepared in the database 121). The train diagram is used for confirming that any train performing power running does not exist around, and if it is judged that no train performing power running train exists around from the train diagram, it may be regarded that regenerative power is not interchanged between trains. In addition, electrical characteristic of a motor and so on which a vehicle holds is lead out by the type and classification, and the regenerative power to be generated may be anticipated from the information.

By taking the operation diagram in the diagram creation apparatus into the power management apparatus, the presence or absence of the interchange of regenerative power between trains can be found. In addition, regarding the train 102 whose regenerative power is not interchanged between trains, and is to be stored in the power storage device 104, the type and classification of the train 102 to be braked can be found, by linking the operation diagram and the type and classification in the vehicle operation plan creation device. And, by collating the type and classification of the train 102 to be braked and the regenerative power amount per formation for each type and classification, it becomes possible to estimate the regenerative power amount generated from the train 102.

As another estimation method of regenerative power, a method in which the power management apparatus 101 acquires a brake pattern from train passing information obtained from an ATC (Automatic Train Control) or another ground device (a brake pattern may be directly obtained from an on-vehicle device), and using a regenerative brake force in the train characteristic which is previously prepared in the power management apparatus 101, calculates a regenerative power amount. Specifically, a regenerative power [kW/MM] for each motor is obtained by a speed [m/s] X a regenerative brake force [kN/MM], and the regenerative powers are integrated for the whole motors, to calculate a regenerative power amount [kWh/MM] of the relevant train 102.

The estimation 134 of the regenerative power amount is performed, by the above-described method, but actually, there may be a case where the regenerative power slightly flows to the next station. Therefore, the value obtained by multiplying the power amount in case that 100% of the regenerative power is stored in the power storage device 104 of the station by the coefficient α is determined as the power amount stored in the power storage device 104. The coefficient is in the range from 0 to 1. In addition, the coefficient α is obtained by comparing the sum of the ideal regenerative power amounts of trains to store power in the power storage device during a unit time, with the power amount stored in the power storage device kept in the database 121. The regenerative power amount for each type and classification in case that loss per formation which is generated at the time of stopping at the station is not present is previously stored as the ideal regenerative power amount.

In addition, as another method, there is also a method which retrieves the train 102 of the same type and classification in the past same train diagram using the database 121, and estimates the regenerative power amount by citing the regenerative power amount which the train 102 has generated.

As the processing of the estimation (135) of the power generation amount of the solar power generation device 106, an art shown in Japanese Patent Application Publication No. 2011-200040 is listed, for example, but here the detail thereof will be omitted. In addition, the entire contents of the above-described document are incorporated herein by reference.

It becomes possible to estimate the charge amount to the power storage device 104, from the processing of the estimation (134) of the regenerative power amount and the processing of the estimation (135) of the power generation amount of the solar power generation device 106 as described above.

To begin with, the discharge plan creation unit 131 performs the estimation of the charge amount to the power storage device 104 for each unit time (60 minutes, for example) with the above-described method.

And after having performed the estimation of the charge amount of the power storage device 104, the discharge plan creation unit 131 calculates a discharge amount in a next unit time. In the calculation of the discharge amount for a next unit time, the estimation value of the charge amount and battery remaining amount data from the power storage device 104. In this case, the discharge amount in the next unit time can be expressed by the following expression.

A discharge amount in the next unit time=an estimated charge amount in the next time−a vacant capacity of the power storage device at present.

But, if the left side is negative, the discharge amount in the next unit time=0.

The above-described expression is a relational expression of the charge amount in the next unit time in which power can be stored up to an upper limit of the capacity of the power storage device after a unit time.

In addition, if the expression described below is satisfied, even if the estimated charge amount in the next unit time generates a small deviation, a relational expression of the charge amount in the next unit time which can charge power without waste can be obtained.

A discharge amount in the next unit time≥an estimated charge amount in the next unit time−a vacant capacity of the power storage device at present At this time, if the estimated charge amount can be estimated in a next, next unit time, the charge amount in the next unit time may appropriately be adjusted.

In the present embodiment, the discharge amount in the next unit time obtained by the above-described expression is constantly outputted within the next unit time. For example, the estimation value of the charge amount to the battery from 8 o'clock to 9 o'clock is 90 kWh, whereas there is a vacant capacity of 10 kWh in the power storage device 104 at 8 o'clock, the discharge amount from 8 o'clock to 9 o'clock becomes 80 kWh. In case that the discharge amount from 8 o'clock to 9 o'clock is 80 kWh, since the power is constantly outputted in the present embodiment, the power is discharged at a rate of 80 kW.

Figure 6:
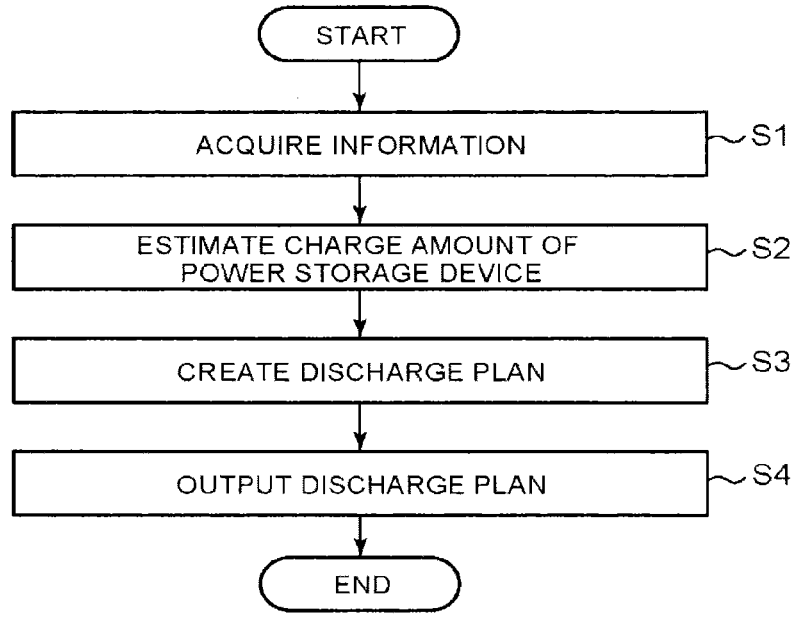
FIG. 6 is an operation flow chart of the discharge plan creation unit in the same embodiment.

Next, an operation (in case of performing estimation) of the discharge plan creation unit 131 will be described using an operation flow chart of FIG. 6.

To begin with, information necessary for the charge amount estimation of the power storage device 104 is acquired, such as an operation diagram of this day from the diagram creation device, a type and classification data from the vehicle operation plan creation device, and weather information necessary for estimating the power generation amount of the solar power generation device 106 (step S1).

Based on the information acquired in the step S1, a regenerative power is estimated with the above-described method, a power generation amount of the solar power generation device 106 is estimated using the above-described method, and a charge amount stored in the power storage device 104 is estimated from these estimation results (step S2).

And, the above-described result of the calculation expression of the discharge amount is made a discharge plan in the relevant time (step S3).

Finally, the created discharge plan is outputted to the discharge amount determination/instruction unit 132 (step S4).

The above description is an operation when the estimation is performed, but in case that a discharge plan is created using the past data in the database 121, after the necessary information is acquired in the step S1, the estimation of the step S2 is omitted, and at the time of creation of a discharge plan in the step S3, a discharge plan using the above-described past data is created.

Upon receiving the discharge plan outputted from the discharge plan creation unit 131 as described above, the discharge amount determination/instruction unit 132 performs a discharge control (137) following this discharge amount plan, and outputs a discharge instruction to the PCS 103 so as to make the power storage device 104 discharge.

The above description is the normal operation, but in case that the discharge can not be performed following the discharge plan due to a drastic delay of the train 102 or an abrupt change in the weather and so on, the battery remaining amount data of the power storage device 104 is acquired, and the discharge is continued with the same discharge amount as performed immediately before till the battery remaining amount runs out. In addition, when power storage to the power storage device is started later, the discharge instruction is outputted again. In addition, regarding the drastic delay of the train 102, in a case where a delay of not less than 30 minutes has occurred upon acquiring the operation state of the train 102 as the train information, or a case where a delay contained in a prescribed stage has occurred in the gradual evaluation, it is determined that a drastic delay has occurred. In addition, regarding an abrupt change in the weather, a case where a prescribed change in the weather has occurred from the acquired weather information, such a case where it has changed from fair to cloudy, or a case where it has changed from fair to rainy, it is determined that a sudden change in the weather has occurred (the same, hereinafter). The discharge plan creation unit 131 judges these, and upon receiving the result, the discharge amount determination/instruction unit 132 outputs the above-described instruction.

On the other hand, the discharge execution result storage unit 133 of the power management apparatus 101 performs a processing of a discharge execution result collection (138) which collects the discharge instruction value from the discharge amount determination/instruction unit 132, the actual discharge amount, the regenerative power amount stored in the power storage device 104, the storage power from the distribution system 108. The collected data is stored in the database 121. The stored data is used when the discharge plan is created using the past data.

According to the railway power management apparatus 101 configured as described above, the power management apparatus 101 estimates the charge amount such as the regenerative power to the power storage device 104, creates the discharge plan to the power storage device 104, and performs discharge control to the distribution system 108, and thereby can store the regenerative power which has not been interchanged between trains, and surplus power of the solar power generation and so on to the power storage device 104, and accordingly, it becomes possible to effectively utilize the energy in the railway facilities.

Second Embodiment

Next, a power management apparatus of a second embodiment will be described in detail. The present embodiment is different from the first embodiment in the point that an SOC (State of Charge) that is a ratio of a remaining charge amount to a battery capacity of the power storage device 104 is taken into consideration, and is common to the first embodiment in other points. Hereinafter, different portions will be described in detail.

Generally, a ratio of a remaining charge amount to a battery capacity of the power storage device 104 at the time of full charge is called an SOC (State of Charge). It is said that a proper range of the SOC exists depending on the kind of the power storage device 104, and the performance deterioration of the power storage device 104 can be prevented by keeping the SOC in the proper range. In the present specification, the proper range of the SOC of the power storage device 104 is called an SOC width. In the embodiment, the discharge plan from the power storage device 104 to the distribution system 108 is created, so that an average SOC per day of the power storage device 104 coincides with an intermediate value of the SOC width of the power storage device 104.

The calculation of the discharge amount in the next unit time in consideration of the SOC is performed, using the present battery remaining amount acquired from the power storage device 104, the capacity of the intermediate value of the SOC width which is different by the kind of the power storage device 104, and the estimation value of the charge amount to the power storage device 104 as described in the first embodiment. In this case, the discharge amount in the next unit time can be expressed by the following expression.

A discharge amount in the next unit time=a battery remaining amount at present−a capacity of an intermediate value of an SOC width+an estimated charge amount in the next unit time.

In the present embodiment, the discharge amount in the next time obtained by the above expression is outputted constantly in the next unit time. The other matters are the same as described in the first embodiment.

In addition, when the discharge is not performed as the discharge plan due to due to a drastic delay of the train 102 or an abrupt change in the weather, the battery remaining data of the power storage device 104 is acquired, and the discharge is performed up to the SOC which a user has previously determined, such as a lower limit value of the SOC width. When the discharge is performed up to the determined SOC, the discharge is once stopped, and when the power storage to the power storage device 104 is started later, and the power storage device 104 is stored up to the intermediate value of the SOC width, an instruction to discharge up to the determined SOC again is outputted.

According to the power management apparatus 101 of the present embodiment, the power management apparatus 101 estimates the charge amount such as the regenerative power to the power storage device 104, creates the discharge plan to the power storage device 104 in consideration of the SOC, and performs discharge control to the distribution system 108, and thereby can store the whole of the regenerative power which has not been interchanged between trains, and surplus power of the solar power generation and so on to the power storage device 104, and accordingly, it becomes possible to effectively utilize the energy in the railway facilities in consideration of the performance of the power storage device 104 (that is, can prevent the performance deterioration of the power storage device 104).

Third Embodiment

Next, a third embodiment will be described in detail. In addition, the same symbols are given to the same portions as those shown in the above-described FIG. 1-FIG. 6, and the description thereof will be omitted. The present embodiment is different from the above-described first embodiment in the point that the power management apparatus 101 acquires usage power/power amount of the station facility 109, and the point that the power management apparatus 101 acquires user information of the station, and creates a discharge plan after performing station facility load estimation from these information. Hereinafter, that point will be described in detail.

Figure 7:
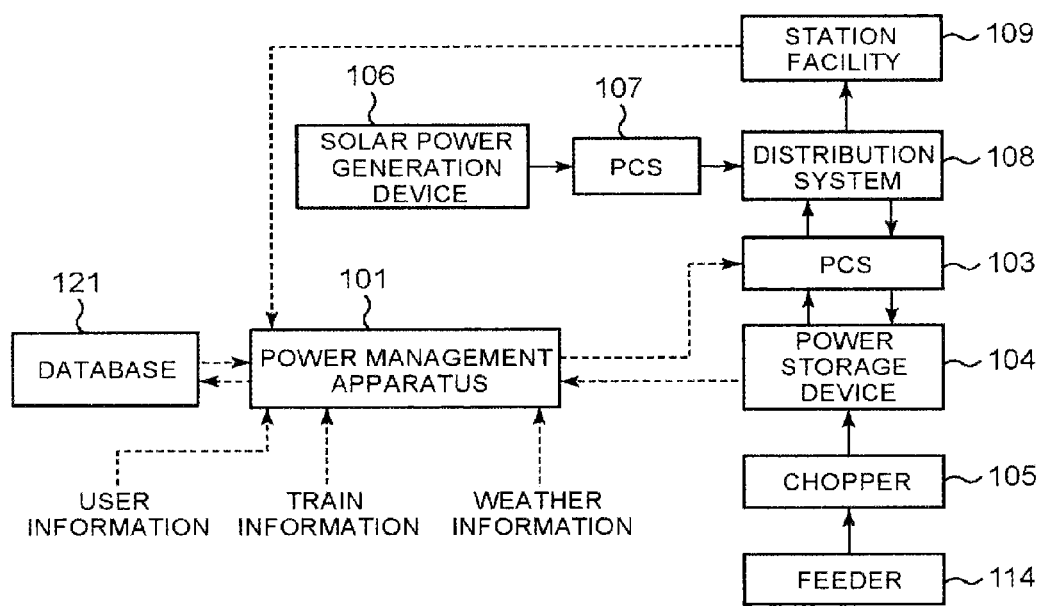
FIG. 7 is a block diagram showing a railway power management apparatus of a third embodiment, the related devices, and data and signals to be exchanged.

FIG. 7 is a block diagram showing the power management apparatus in the third embodiment, the related devices, and the data and signals to be exchanged.

Each of the station facilities 109 can measure its usage power/power amount, and the power management apparatus 101 acquires data of the usage power/power amount of each of the station facilities 109, to enable estimation of load of each of the station facilities 109. In addition, the power management apparatus 101 acquires user information, in addition to the train information and the weather information.

Figures 1, 2, 8:
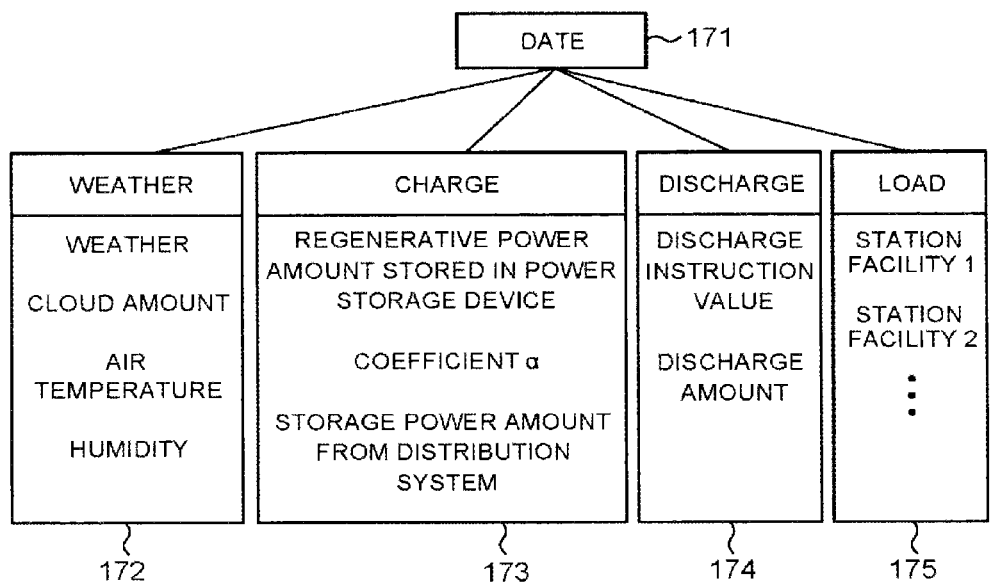

FIG. 8-1 is a diagram to exemplify a structure of the database in the present embodiment. The database 121 is a hierarchical type, and stores data, such a manner that the date 171 is determined as a parent, and each of the weather 172, the charge 173, the discharge 174, a load 175 is determined as a child. Each data of the weather 172, the charge 173, the discharge 174 is the same as that of FIG. 3-1. The data of the load 175 is composed of a time, and load values of the respective station facilities 109 (a station facility 1, a station facility 2, . . . ) (refer to FIG. 8-2). In addition, the load value of the station facility 109 is a power/power amount used in the relevant station facility 109, and is obtained by a smart meter and so on, for example. In addition, in the present embodiment, at the time of storing the discharge execution result in the database 121, data including the number of station users is recorded correspondingly to the above-described load value of the station facility 109.

Figure 9:
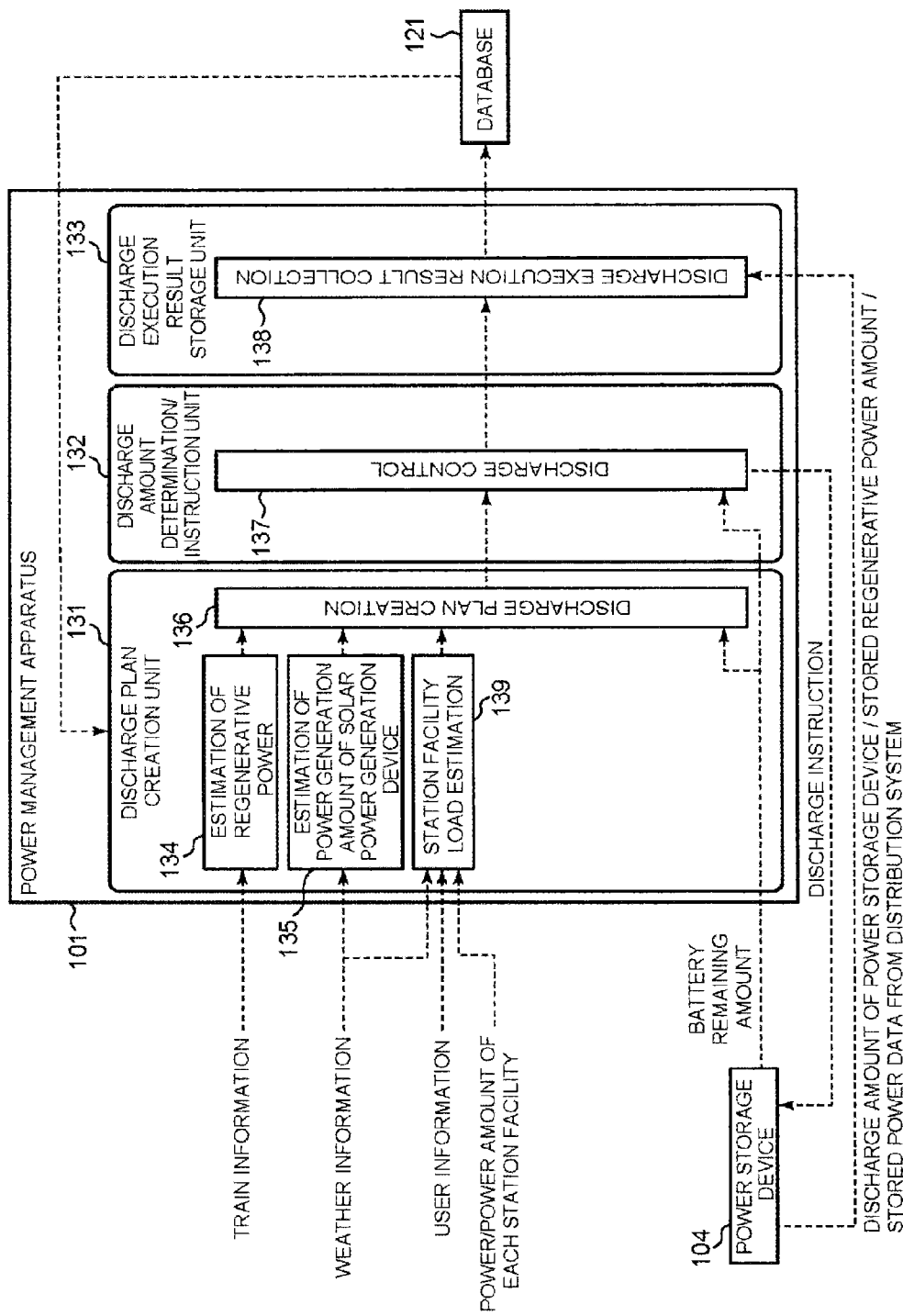
FIG. 9 is a block diagram showing the railway power management apparatus in the third embodiment.

FIG. 9 is a block diagram of the power management apparatus in the present embodiment.

The discharge plan creation unit 131 of the power management apparatus 101 performs a processing of a station facility load estimation (139), in addition to the processing of the estimation (134) of the regenerative power amount, and the processing of the estimation (135) of the power generation amount of the solar power generation device 106.

The processing of the station facility load estimation (139) estimates, using the past data of the load value of each of the station facilities 109 stored in the data base 121, a load value of each of the station facilities 109 in a next unit time (60 minutes, for example). This estimation is performed, by taking an average from the load values of the station facility 109 at the similar time zone in a day in the same weather of the same month of the previous fiscal year or this fiscal year, for example. In addition, here, the term "similar" means that a value is within a prescribed range, for a comparison destination value and so on (the same, hereinafter).

In addition, the discharge plan creation unit 131 acquires data of weather, an air temperature, a humidity out of the weather information, and the number of station users out of the user information. By using these information, it becomes possible that the load value of the station facility 109 such as an air conditioner and an elevator can be estimated more accurately. In addition, this estimation is performed, by taking an average from the load values of the station facility 109 at the similar time zone under the same weather condition in a day with the similar number of station users of the same month of the previous fiscal year or this fiscal year, for example.

In the present embodiment, the discharge plan creation unit 131 performs the acquisition of the information (step S1), and the estimation of the charge amount of the power storage device 104 (step S2), similarly as the first embodiment. After that, the discharge plan creation unit 131 performs the estimation of the station load using the data of power/power amount of each of the station facilities 109. In the present embodiment, the charge amount (charge plan) is determined in the similar method as the first embodiment, but even when the station load portion can not be covered, a method to discharge the whole station load portions can also be selected, as long as the battery remaining amount is present.

In the first embodiment, the power stored in the power storage device 104 has been discharged in accordance with the estimated charge amount, but in the present embodiment, it becomes possible to create the discharge plan in accordance with the load of the station facility 109 by acquiring the usage power/power amount of the station facility 109, and estimating the load of the station facility 109.

Fourth Embodiment

Subsequently, a fourth embodiment will be described in detail. In addition, the same symbols are given to the same portions as those shown in the above-described FIG. 1-FIG. 9, and the description thereof will be omitted. Compared with the above-described third embodiment, the present embodiment is different in that the SOC of the power storage device 104 is taken into consideration. Hereinafter, that point will be described in detail.

In the present embodiment, the discharge plan creation unit 131 determines the discharge amount (discharge plan) with the similar method as the second embodiment, but even when the station load portion can not be covered, the station load portion is discharged to the extent of the discharge amount of the following expression. In addition, a method to discharge the whole station load portion, without keeping the SOC width can also be selected.

A discharge amount in a next unit time=a battery remaining amount at present−a capacity of a lower limit value of an SOC width+an estimated charge amount in the next unit time.

In addition, as another method, there is also a method which acquires data (load value) of a power/power amount of each of the station facilities 109 by the discharge determination/instruction unit 132 from the outside, and when the load value exceeds a prescribed threshold value, creates a discharge instruction value in a real time by ignoring the discharge plan, and discharges the power within the SOC width.

According to the power management apparatus 101 of the present embodiment, it becomes possible to discharge the power stored in the power storage device 104 in accordance with the load, while keeping the performance of the power storage device 104, by creating the discharge plan in accordance with the load of the station facility 109 in consideration of the SOC.

Fifth Embodiment

Subsequently, a power management apparatus of a fifth embodiment will be described in detail. In addition, the same symbols are given to the same portions as those shown in the above-described FIG. 1-FIG. 9, and the description thereof will be omitted. The present embodiment is different in that the power management apparatus 101 acquires power use restriction information, received power/power amount data of the distribution system 108 from a substation, and battery performance data (performance information) of the power storage device 104. Hereinafter, that point will be described in detail.

Figure 10:
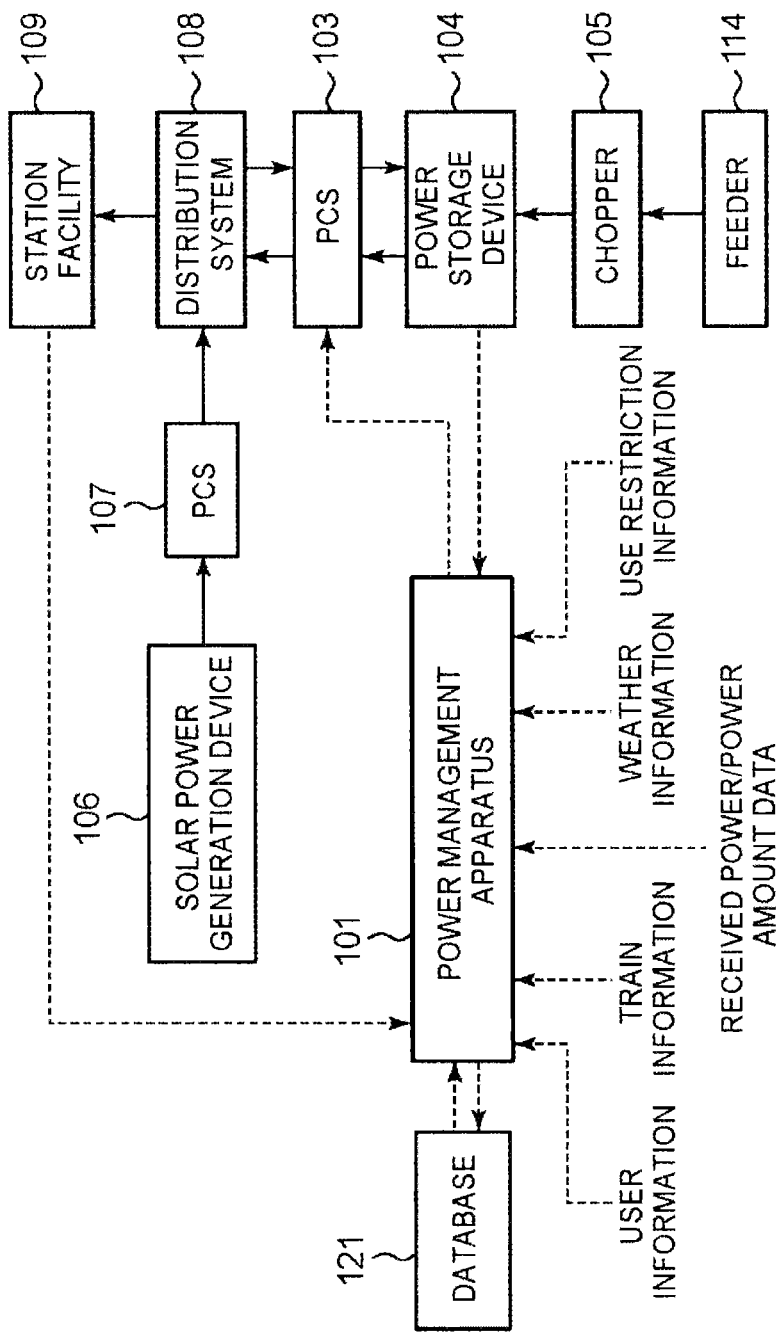
FIG. 10 is a block diagram showing the railway power management apparatus of the same embodiment, the related devices, and data and signals to be exchanged.

FIG. 10 is a block diagram showing the power management apparatus for railway systems of the present embodiment, the related devices, and the data and signals to be exchanged.

The power management apparatus 101 acquires the power use restriction information, the received power/power amount data of the distribution system 108 from a substation, and the number of chargeable and dischargeable times out of the battery performance data of the power storage device 104, creates a discharge plan in consideration of these, and performs determination/instruction of the discharge amount.

Figure 11:
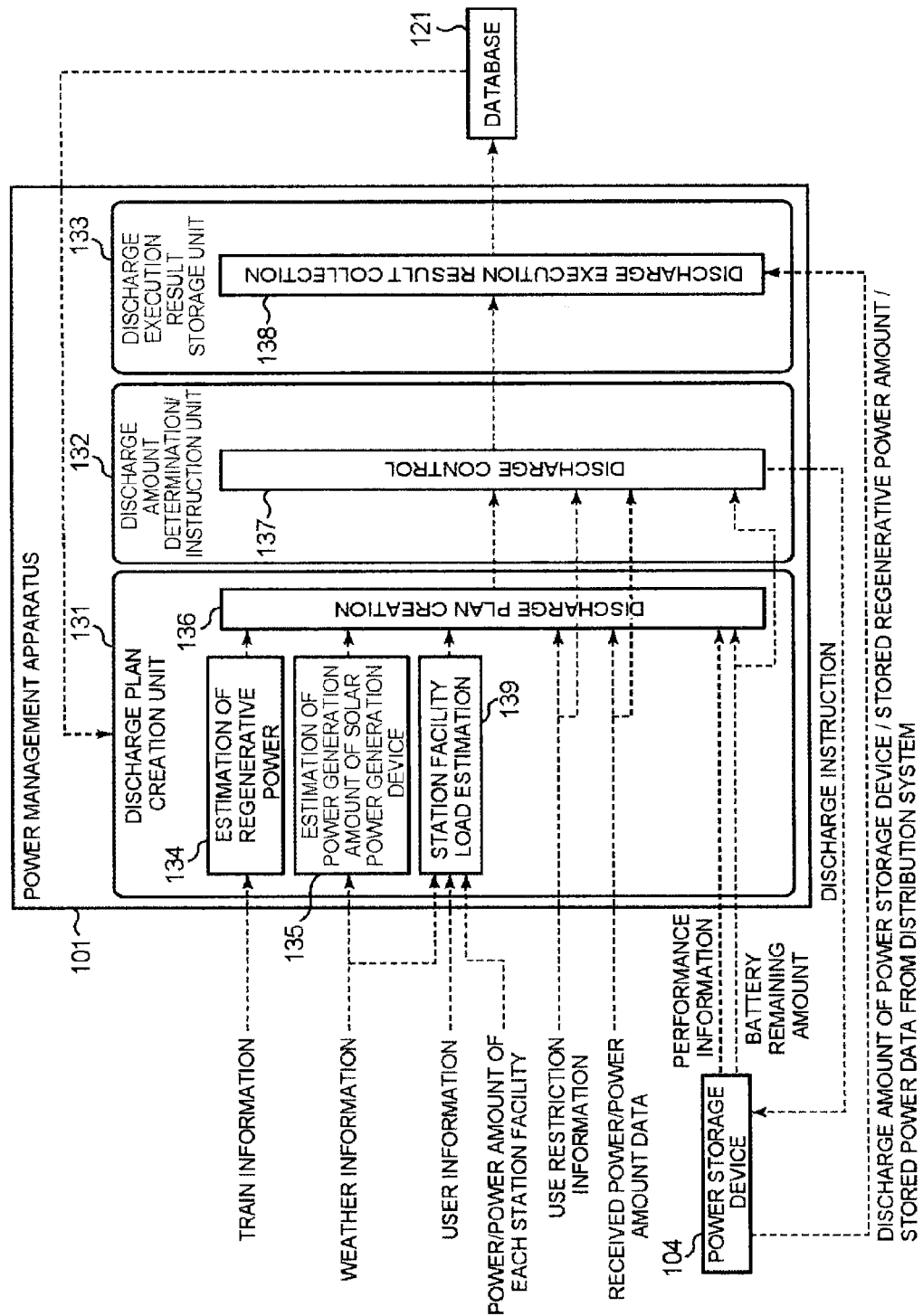
FIG. 11 is a block diagram showing a configuration of a railway power management apparatus in a fifth embodiment.

FIG. 11 is a block diagram showing a configuration of the power management apparatus for railway systems in the present embodiment.

The discharge plan creation unit 131 acquires the received power/power amount data of the distribution system 108 from the substation. Upon acquiring the power use restriction information, such as requested electricity saving, the discharge plan creation unit 131 creates a discharge plan, based on the load estimation result of the station facility 109, within the SOC width, if possible, and by ignoring the SOC width if it is impossible to make the SOC within the SOC range, so that the received power/power amount from the substation does not exceed the use restriction value. In addition, it becomes possible to also create a discharge plan so that the received power from the substation can be grasped at any time, and the contract demand with a power company is not exceeded.

In addition, also the discharge amount determination/instruction unit 132 acquires the received power/power amount data of the distribution system 108 from the substation. And when judging that in the discharge in accordance with the discharge plan created by the discharge plan creation unit 131, the received power/power amount from the substation might exceed the use restriction value, the discharge amount determination/instruction unit 132 finely adjusts the discharge amount so that the received power/power amount does not exceed the use restriction value, by increasing the discharge amount of the power storage device 104, for example.

In addition, the discharge plan creation unit 131 acquires the received power/power amount data of the distribution system from the substation, and thereby can grasp the received power from the substation at any time, and accordingly it becomes possible to form also a discharge plan so that the received power/power amount does not exceed the contract demand with a power company. In addition, the discharge amount determination/instruction unit 132 also acquires the received power/power amount data of the distribution system 108 from the substation, and thereby in case that, in the discharge in accordance with the discharge plan, the received power/power amount might exceed the contact demand, it becomes possible to finely adjust the discharge amount so that the received power/power amount does not exceed the contract demand with a power company.

In addition, the discharge plan creation unit 131 acquires the number of chargeable and dischargeable times out of the battery performance of the power storage device 104, and performs estimation of the capacity and the replacement time of the power storage device 104, from this number of chargeable and dischargeable times and the number of times of charging the regenerative power to the power storage device 104. It becomes possible to keep the safety of the system, by estimating the replacement time of the power storage device 104, as in this manner.

In the above-described first and second embodiments, and the third and fourth embodiments, the normal charge/discharge of the power storage device 104 has been dealt, but in the present embodiment, it becomes possible to create the discharge plan in consideration of the factors, such as the use restriction of the power, the contract demand, and the life of the power storage device 104.

Sixth Embodiment

A sixth embodiment will be described in detail. The configuration of the power management apparatus 101 in the present embodiment and the related devices can basically be made similar to that described in the above-described first to fifth embodiments. the present embodiment is different from the above-described various embodiments in a use method of the solar energy obtained from the solar power generation device 106. Hereinafter, that point will be described in detail.

The solar energy obtained from the solar power generation device 106 is connected to the distribution system 108, and is basically used in the station facility 109, but in the present embodiment, whether to charge the solar power energy in the power storage device 104 as in the above-described first to fifth embodiments, or to sell it to a power company is made to be optionally selectable by a user. The present embodiment is configured so that the instruction therefor can be instructed to the power management apparatus 101. For example, the two are made selectable by a selection button and so on by a GUI and so on, which is provided in the power management apparatus 101. The power management apparatus 101 creates a discharge plan according to the selection, and performs determination and instruction of a discharge amount. The discharge plan created by the discharge plan creation unit 131 is created so that the storage of the power to the power storage device 104 is excluded, when the selection to sell the power obtained from the solar power generation device 106 to a power company is made.

In the present embodiment, since a user can select a use method of the solar power energy, it becomes possible to realize the power management apparatus which meets user's needs.

As described above, according to the first to sixth embodiments, it is possible to make the power storage device 104 which stores the regenerative power and the power obtained from the solar power generation in a station facility, and discharges the power to the distribution system 108 perform effective discharge, and as a result, it is possible to utilize the regenerative power and the power obtained from the solar power generation.

In addition, it is possible to realize the power management apparatuses 101 of the above-described various embodiments, in such a way that, using a general information processing apparatus, the control means configured by its central processing unit and its control program is functioned as the discharge plan creation unit 131, the discharge amount determination/instruction unit 132, the discharge execution result storage unit 133. In addition, the database 121 can be realized using a storage device provided in this information processing apparatus. Besides, each of the power management apparatuses 101 of the various embodiments can also be realized as an exclusive apparatus (hardware).

In addition, a program which makes a process of the present embodiment to be executed and the related data may be provided in the form of a computer readable storage medium. For example, the storage mediums are a CD-ROM (Compact Disk Read Only Memory), a floppy disk (FD), CD-R (Compact Disk Recordable), a DVD (Digital Versatile Disk) and so on.

In addition, the program to make the process of the present embodiment to be executed and the related data may be stored in a computer which has been downloaded through a network, such as the Internet, for example. In addition, they may be provided in a state where they are downloadable to a computer, and so on the networks. In addition, the program to make the process of the present embodiment to be executed and the related data may be provided in a state where they are downloadable at separate places on the cloud, or may be provided in a state where they are executable at the place.

In addition, the program to make the process of the present embodiment to be executed and the related data may be provided in a state where they are stored in the ROM or the flash memory and so on in the apparatus.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power management apparatus, comprising:
   storage means which stores a discharge amount of a power storage device to a distribution system, correspondingly to a prescribed parameter;
   discharge plan creation means which, when storable regenerative power is generated, creates a discharge plan to determine a discharge amount of the power storage device, from past data stored in the storage means, of regenerative power amount of a train and the discharge amount of the power storage device to the distribution system; and
   discharge instruction means which outputs a discharge instruction to the power storage device.

2. The power management apparatus as recited in claim 1, wherein: the discharge plan creation means uses a time and weather data as the prescribed parameter, and creates the discharge plan, using the past data of the discharge amount stored in the storage means, corresponding to a time and weather data similar to a present time and present weather data.

3. The power management apparatus as recited in claim 2, wherein: the discharge plan creation means makes a regenerative power without interchange between trains as the storable regenerative power, estimates a regenerative power amount of a train without interchange between trains, estimates the charge amount to the power storage device from the relevant estimation result, and creates the discharge plan to determine the discharge amount of the power storage device corresponding to the charge amount.

4. The power management apparatus as recited in claim 3, wherein: the discharge plan creation means further estimates a power generation amount of a solar power generation device, estimates the charge amount to the power storage device, from a result of the relevant estimation and a result of the estimation of the regenerative power of the train, and creates the discharge plan corresponding to the relevant charge amount.

5. The power management apparatus as recited in claim 3, wherein: the discharge plan creation means acquires a brake pattern of the train in a real time, and estimates the regenerative power amount of the relevant train based on the relevant brake pattern.

6. The power management apparatus as recited in claim 3, wherein: the discharge plan creation means acquires an operation diagram and type collation data of the train, and estimates the regenerative power amount to be stored in the power storage device, from the regenerative power amount of the relevant train which is found by presence or absence of interchange of regenerative power between trains and a type and classification letter of the train.

7. The power management apparatus as recited in claim 3, wherein: the discharge plan creation means acquires use power amount of each of station facilities, estimates a load of each of the station facilities, and creates the discharge plan including the estimated load of each of the station facilities.

8. The power management apparatus as recited in claim 7, wherein: the discharge plan creation means acquires weather information and user information, and estimates the load of each of the station facilities, based on the weather information, the user information and past data of the load of each of the station facilities stored in the storage means.

9. The power management apparatus as recited in claim 1, wherein: the discharge plan creation means creates the discharge plan in which a remaining amount of the power storage device falls within a range of an SOC (State Of Charge).

10. The power management apparatus as recited in claim 9, wherein: the discharge plan creation means creates the discharge plan of the power storage device to the distribution system, by ignoring the range of the SOC at the time of power use restriction.

11. The power management apparatus as recited in claim 9, wherein: the discharge plan creation means acquires a received power/received power amount from the substation, and creates the discharge plan so that the relevant received power/received power amount does not exceed a contract demand.

12. In a power management method having a power storage device which is connected to a feeder to feed power to a railway, can be charged with a regenerative power generated from the railway, and is connected to a distribution system to supply power to a station facility, and can discharge power to the distribution system, the power management method comprising:
   acquiring charge amount estimation information necessary for charge amount estimation of the power storage device;
   estimating a charge amount of the power storage device based on the charge amount estimation information;
   calculating a discharge amount from the estimated charge amount and a remaining amount of the power storage device; and
   discharging the discharge amount from the power storage device to the distribution system.

13. The power management method of claim 12, wherein: the charge amount estimation information includes regenerative power estimation information for estimating a charge amount for charging the regenerative power generated from the railway in the power storage device.

14. The railway power management method of claim 13, wherein:
   the regenerative power estimation information includes train information including an operation diagram and type and classification letter data; and
   the regenerative power to be generated is estimated based on the operation diagram and type and classification letter.

15. The power management method of claim 13, further comprising: acquiring a brake pattern; wherein the regenerative power is estimated from a regenerative brake force of the train.

16. The power management method of claim 12, wherein the distribution system is connected to a solar power generation device, and further comprising:
   storing a power generation amount from the solar power generation device in the power storage device through the distribution system;
   storing weather data of any of weather, a cloud amount, an air temperature, a humidity; and
   estimating a power storage amount to be stored in the power storage device from the stored weather data.

17. The power management method of claim 12, further comprising:
   storing the calculated discharge amount and an actual discharge amount; and
   calculating a discharge amount using the stored past data.

18. The power management method of claim 16, further comprising:
   storing the regenerative power amount stored in the power storage device;
   storing the power storage amount stored in the power storage device from the distribution system connected to the solar power generation device; and
   calculating the discharge amount using the stored past data.

* * * * *